United States Patent
Gorti et al.

(10) Patent No.: US 11,960,893 B2
(45) Date of Patent: Apr. 16, 2024

(54) MULTI-TABLE INSTRUCTION PREFETCH UNIT FOR MICROPROCESSOR

(71) Applicant: International Business Machines Corporation, Armonk, NY (US)

(72) Inventors: Naga P. Gorti, Austin, TX (US); Mohit Karve, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/565,001

(22) Filed: Dec. 29, 2021

(65) Prior Publication Data

US 2023/0205543 A1  Jun. 29, 2023

(51) Int. Cl.
*G06F 9/38* (2018.01)

(52) U.S. Cl.
CPC .......... *G06F 9/3806* (2013.01); *G06F 9/3844* (2013.01)

(58) Field of Classification Search
CPC ............................ G06F 9/3804; G06F 9/3806
See application file for complete search history.

(56) References Cited

U.S. PATENT DOCUMENTS

| | | | |
|---|---|---|---|
| 5,964,869 A | 10/1999 | Talcott et al. | |
| 6,651,162 B1 * | 11/2003 | Levitan | G06F 9/3806 712/206 |
| 7,065,633 B1 | 6/2006 | Yates, Jr. et al. | |
| 7,082,520 B2 * | 7/2006 | Bonanno | G06F 9/322 712/240 |
| 9,753,855 B2 | 9/2017 | Lin | |
| 2008/0209173 A1 * | 8/2008 | Evers | G06F 12/0862 712/237 |

(Continued)

FOREIGN PATENT DOCUMENTS

| | | |
|---|---|---|
| CN | 105988774 A | 10/2016 |
| CN | 111158754 A | 5/2020 |
| CN | 113515311 A | 10/2021 |

OTHER PUBLICATIONS

International Search Report dated Nov. 28, 2022, received in a corresponding foreign application, 9 pages.

(Continued)

*Primary Examiner* — Courtney P Carmichael-Moody
(74) *Attorney, Agent, or Firm* — Scully, Scott, Murphy & Presser, P.C.

(57) ABSTRACT

A method, programming product, and/or system for prefetching instructions includes an instruction prefetch table that has a plurality of entries, each entry for storing a first portion of an indirect branch instruction address and a target address, wherein the indirect branch instruction has multiple target addresses and the instruction prefetch table is accessed by an index obtained by hashing a second portion of bits of the indirect branch instruction address with an information vector of the indirect branch instruction. A further embodiment includes a first prefetch table for uni-target branch instructions and a second prefetch table for multi-target branch instructions. In operation it is determined whether a branch instruction hits in one of the multiple prefetch tables; a target address for the branch instruction is read from the respective prefetch table in which the branch instruction hit; and the branch instruction is prefetched to an instruction cache.

18 Claims, 6 Drawing Sheets

(56) References Cited

U.S. PATENT DOCUMENTS

| | | | | |
|---|---|---|---|---|
| 2009/0198981 A1* | 8/2009 | Levitan | ............... | G06F 9/30061 |
| | | | | 712/E9.016 |
| 2011/0078425 A1* | 3/2011 | Shah | ..................... | G06F 9/3855 |
| | | | | 712/E9.045 |
| 2013/0275726 A1 | 10/2013 | Ukai | | |
| 2014/0019721 A1* | 1/2014 | Stavrou | ................. | G06F 9/3017 |
| | | | | 712/207 |
| 2015/0149723 A1 | 5/2015 | Lin | | |

OTHER PUBLICATIONS

Anonymous, "Method and Apparatus for Predicted Prefetch Suppression", IP.com No. IPCOM000199675D IP.com Electronic Publication Date: Sep. 14, 2010, 3 pages.
Anonymous, "System and Method for Recovering Global Branch Prediction Information Using Address Offset Information", IP.com No. IPCOM000216961D, IP.com Electronic Publication Date: Apr. 25, 2012, 5 pages.
Anonymous, "Method and Apparatus for Early Fetch Redirection in a computer processor", IP.com No. IPCOM000223643D, IP.com Electronic Publication Date: Nov. 20, 2012, 6 pages.
Veidenbaum, A., et al., "Non-Sequential Instruction Cache Prefetching for Multiple—Issue Processors", International Journal of High Speed Computing, 1999, pp. 115-140, vol. 10, No. 01.
Veidenbaum, A., "Instruction Cache Prefetching Using Multilevel Branch Prediction", International Symposium on High Performance Computing, ISHPC 1997, pp. 51-70, High Performance Computing.

\* cited by examiner

MULTI-TABLE INSTRUCTION PREFETCH UNIT FOR MICROPROCESSOR

BACKGROUND

The disclosure herein relates generally to handling and processing data and/or improving an information handling or data processing system, e.g., a processor, and more specifically to prefetching instructions in such systems.

Computing demands require the ability to access data and execute increasingly complex applications with increasing speed and efficiency. One technique to increase speed and decrease latency in processors is to prefetch instructions and data so that the data is local to the processor before it is needed. Non-sequential jumps in code execution can occur and are generally the result of a branch instruction. Handling branch instructions, including the different types of branch instructions, and prefetching the targets of branch instructions can be problematic and it would be advantageous if prefetching the targets of branch instructions could be handled with greater efficiency.

SUMMARY

The summary of the disclosure is given to aid understanding of information or data handling systems, for example processors, including out-of-order information handling systems and processors, and such systems that utilize instruction prefetch units (also referred to as prefetchers), and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the techniques, methods, and/or systems for prefetching instructions.

A system, computer program product, and/or method is described according to one or more embodiments for processing instructions, including in one or more embodiments prefetching instructions and data in a processor. In one or more approaches a system, programming product, processor and/or method of prefetching instructions is disclosed, the method including: detecting a branch instruction that misses in an instruction cache; determining whether the branch instruction that missed in the instruction cache hits in one of multiple prefetch tables in an instruction prefetcher, wherein a first prefetch table of the multiple prefetch tables stores target addresses for uni-target branch instructions and a second prefetch table of the multiple prefetch tables stores target addresses for multi-target branch instructions; reading, in response to the branch instruction that missed in the instruction cache hitting in one of the multiple prefetch tables in the prefetcher, a target address for the branch instruction from the respective prefetch table in which the branch instruction hit; and prefetching the target address for the branch instruction to an instruction cache. Determining whether the branch instruction that missed in the instruction cache hits in one of the multiple prefetch tables in an aspect includes concurrently searching the first prefetch table and the second prefetch table. In an embodiment, the second prefetch table is indexed by a first portion of a branch instruction address and a hash of history bits of the branch instruction address. In an example, the second prefetched table is indexed by XORing the first portion of the branch instruction with the history bits of the branch instruction. In a further embodiment, the system, programming product, processor and/or method further include determining whether the branch instruction that missed in the instruction cache hits in a third prefetch table, wherein the second prefetch table stores a target address for a first type of multi-target branch instruction and the third prefetch table stores a target address for a second type of multi-target branch instruction.

In one or more embodiments, determining whether the branch instruction hits in the second prefetch table includes determining an index into the second branch prefetch table for the incoming branch instruction by hashing a first portion of the branch instruction with an information vector; reading one or more tag bits from one or more Ways corresponding to the determined index in the second prefetch table; determining whether the one or more tag bits read from the one or more Ways in the second prefetch table matches the tag bits from the branch instruction; and determining, in response to one or more tag bits read from the one or more Ways in the second prefetch table matching the tag bits from the branch instruction, that there is a hit in the second prefetch table. The information vector according to an approach is at least one of a group consisting of: a global direction history vector, an indirect global history vector, and combinations thereof. The system, programming product, processor and/or method in one or more arrangements includes XORing an index portion of the incoming branch instruction with history bits of the branch instruction to determine the index into the second prefetch table for the incoming branch instruction. In a further aspect, the system, programming product, processor and/or method further includes determining an index into the first prefetch table for an incoming branch instruction from a first portion of the branch instruction; reading one or more tag bits from one or more Ways corresponding to the determined index in the first prefetch table; determining whether the one or more tag bits read from the one or more Ways in the first prefetch table matches the tag bits from the branch instruction; and determining, in response to one or more tag bits read from the one or more Ways from the first prefetch table matching the tag bits from the branch instruction, that there is a hit in the first prefetch table. The system, programming product, processor, and/or method further includes, in an embodiment, installing a branch instruction into one of the multiple prefetch tables in the instruction prefetch unit based upon the type of branch instruction, which according to an aspect can include: determining the type of branch instruction; installing, in response to the determining the branch instruction is a direct uni-target branch instruction, the branch instruction and a target relationship into the first prefetcher table; and installing, in response to the determining the branch instruction is an indirect multi-target branch instruction, the branch instruction and a target relationship into the second prefetcher table.

In a further aspect, an instruction prefetch table for an instruction prefetcher in a processor is disclosed where the instruction prefetch table includes: a plurality of entries, each entry for storing a first portion of bits of an indirect branch instruction address and a target address corresponding to the indirect branch instruction address, wherein the indirect branch instruction has multiple target addresses, wherein the instruction prefetch table is accessed by an index obtained by hashing a second portion of bits of the indirect branch instruction address with an information vector of the indirect branch instruction. In an example, the first portion of bits are tag bits of an indirect branch instruction address and is 10-20 bits in length and the second portion of bits of the indirect branch instruction address are index bits and is 8-16 bits in length. In an embodiment each index of the instruction prefetch table has a plurality of associated entries having tag bits and an associated target address, the instruction prefetch table configured to determine if an incoming indirect branch instruction matches a Way in the instruction prefetch table by: identifying an index in the instruction prefetch table by hashing a second portion of the incoming branch instruction with an information vector; reading one or more tag bits from one or more Ways corresponding to the identified index; determining whether the one or more tag bits read from the one or more Ways in the second prefetch table matches the tag bits from the branch instruction; and determining, in response to one or more tag bits read from the one or more Ways in the second prefetch table matching the tag bits from the branch instruction, that there is a hit in the second prefetch table.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of methods, techniques, systems, processors, processor architecture, and/or programming products for processing data, including for example, microprocessors that utilize prefetchers will be better understood when read in conjunction with the figures provided. It may be noted that in the figures provided a numbered element is typically numbered according to the figure in which the element is introduced, is typically referred to by that number throughout succeeding figures, and that like reference numbers generally represent like parts of exemplary embodiments of the invention.

Embodiments are provided in the figures for the purpose of illustrating aspects, features, and/or various embodiments of the methods, techniques, systems, processors, prefetching units, and/or programming products for processing data including for example prefetching instructions and data in, for example, microprocessors, but the claims should not be limited to the precise arrangement, structures, features, aspects, assemblies, subassemblies, systems, circuitry, functional units, programming, instructions, embodiments, methods, processes, or devices shown. The arrangements, structures, features, aspects, assemblies, subassemblies, systems, circuitry, functional units, programming, instructions, embodiments, methods, processes, and/or devices shown may be used singularly or in combination with other arrangements, structures, features, aspects, assemblies, subassemblies, systems, circuitry, functional units, programming, instructions, embodiments, methods, processes, and/ or devices.

DETAILED DESCRIPTION

Figure 1:
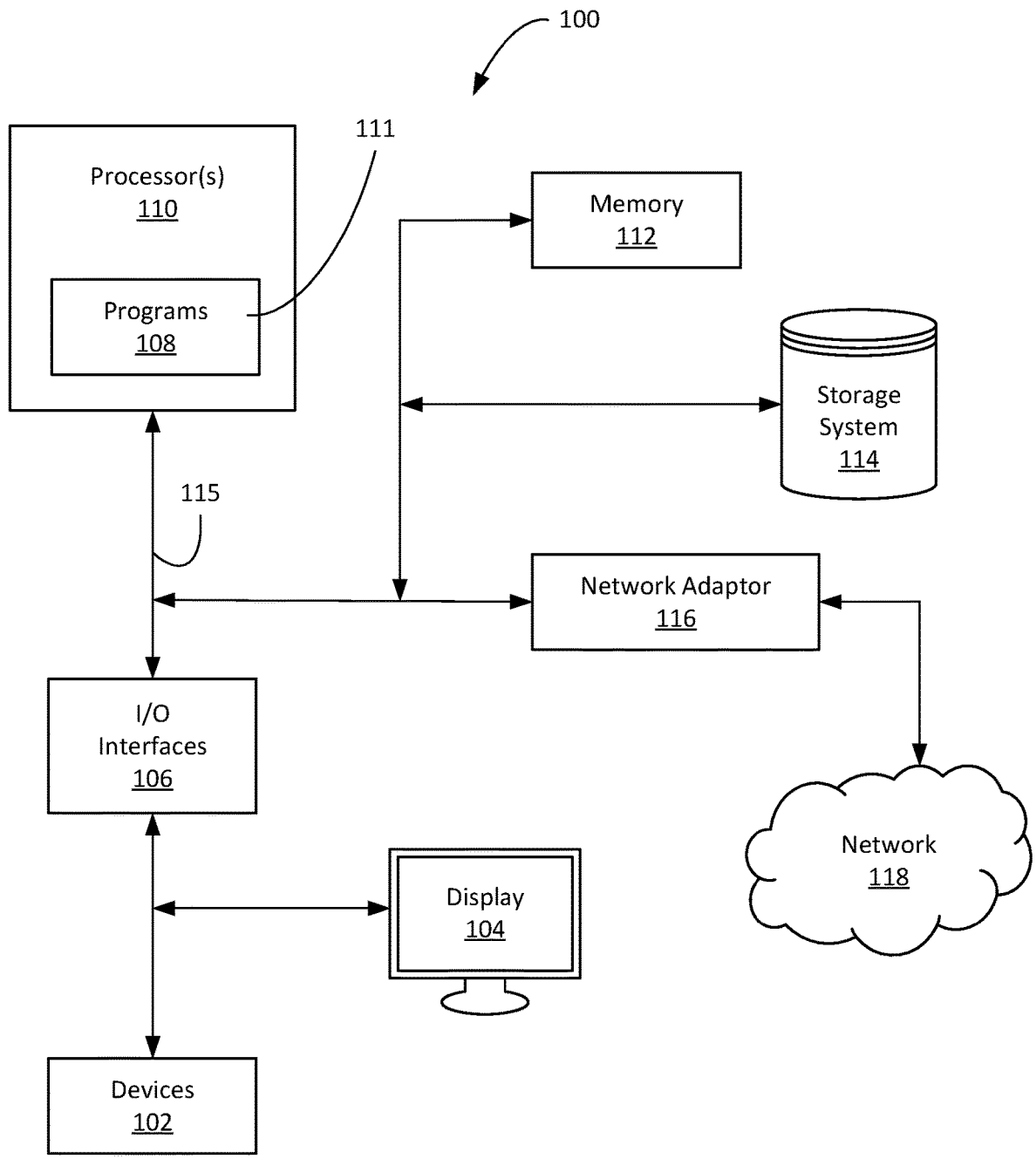
FIG. 1 schematically shows a block diagram of an exemplary computer system, including processor, on which the present disclosure may be practiced according to an embodiment.

The following description is made for illustrating the general principles of the invention and is not meant to limit the inventive concepts claimed herein. In the following detailed description, numerous details are set forth in order to provide an understanding of methods, techniques, and systems for processing data for example in an integrated circuit, e.g., a processor, including the use of a prefetching, however, it will be understood by those skilled in the art that different and numerous embodiments of the systems, microprocessors, methods, and/or techniques may be practiced without those specific details, and the claims and disclosure should not be limited to the embodiments, features, aspects, assemblies, subassemblies, structures, configurations, arrangements, functional units, circuitry, prefetchers, programming, instructions, processes, methods, or details specifically described and shown herein. In addition, features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It should also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes processing instructions and data in integrated circuits, including, for example, processors and microprocessor systems and architectures, including out-of-order processing of instructions using a prefetcher, which are apparent to those skilled in the art. It is assumed that those skilled in the art are familiar with processing instructions and data in integrated circuits, including in, for example, microprocessors (also referred to as processors) using instruction prefetching.

Computing demands are requiring faster and more efficient processing of instructions and data. Microprocessors have been developed to meet those demands including the development of out-of-order processors. Other techniques to increase the speed and efficiency of processors includes the use of prefetching of instructions and data so that data is local to the processor as it is needed. A processor needs to be able to process and execute many different types of instructions. One type of instruction that can be difficult to process and add latency to a processor are conditional branch instructions. There are two types of conditional branch instructions. A first type of branch instruction, a simple branch instruction, has a single target (referred to as uni-target or direct branches); while other complex branch instructions have multiple targets (referred to as multi-target or indirect branches). Utilizing prefetchers to prefetch targets of branch instructions can be problematic.

Typically, prefetchers make no distinction on the type of branch instruction that triggers a non-sequential jump in the fetch path and treats uni-target direct branches the same as indirect multi-target branches. Accessing direct uni-target branches can generally be easily tracked in a conventional prefetcher, including using a conventional, non-sequential branch instruction prefetch table by creating a single trigger-target relationship. Indirect multi-target branches, however, may have tens or even hundreds of different targets that emanate from the same trigger cache line. Accordingly, using a conventional non-sequential prefetch table that uses a single trigger-target relationship is very inefficient and basically useless for indirect branches that have widely divergent access behaviors. It would be advantageous to prefetch the targets of indirect non-sequential branch instructions in an efficient manner, and further advantageous to be able to prefetch the targets of both direct uni-target branch instructions and indirect, multi-target branch instructions in an efficient manner.

In one or more embodiments, prefetching the targets of indirect, non-sequential branch instructions utilize an information vector, preferably based upon path history, to improve prefetching. In one or more approaches, an information vector is added to a prefetcher table to improve prefetching the targets of indirect multi-target branch instructions.

Adding an information vector to a single prefetcher table used to handle direct, uni-target accesses could potentially decrease performance of prefetching direct, uni-target conditional branches. In one or more approaches, indirect multi-target branch instructions are added to a prefetcher table using an information vector, such as, for example, a global direction history vector or an indirect global history vector. In one or more further aspects, an instruction prefetcher can use two (or more) instruction prefetch tables that store different types of branch instructions differently, potentially providing improved prefetching of the targets of both direct, uni-target branch instructions and indirect, multi-target branch instructions. In one or more approaches, an instruction prefetcher uses a multi-table design where one table is used for direct, uni-target branch instructions that can be easily predicted, while a second table can be used for indirect, multi-target branch instructions, where the instruction prefetcher will provide better prefetching of the targets for both types of branch instructions. Preferably the prefetcher performs what the branch predictor performs but earlier, e.g., a few cycles earlier, and reduces latency of future misses in the processor, e.g., instruction cache misses.

In an arrangement, the second table used for indirect, multi-target branch instructions uses an information vector, for example a global direction history vector or an indirect global history vector, and in an aspect indirect, multi-target branch instructions are added to the second table using the information vector. A multi-table prefetcher will potentially allow better prefetching of the targets for both types of branch instructions. A multi-table non-sequential instruction prefetcher according to an embodiment contains a primary or first table that holds trigger-target relationships for direct or uni-target branches and a second table that holds trigger-target relationships for indirect or multi-target branch instructions. Both tables can be similar in terms of the fields in the tables, namely a tag (portions of an instruction (trigger) address), a target address, a confidence field, and some additional bits for validity and replacement. The uni-target and/or multi-target tables can be direct mapped or set associative.

FIG. 1 illustrates an example computing and/or data processing environment 100 in which aspects of the present disclosure may be practiced. It is to be understood that the computer and/or data processing environment 100 (also referred to as a computing and/or information handling system 100) depicted is only one example of a suitable computing environment and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 1 may include, but are not limited to, server computer systems, mainframe computers, distributed cloud computer systems, personal computer (PC) systems, PC networks, thin clients, thick clients, minicomputer systems, laptop devices, tablets, hand-held devices, smartphones, set top boxes, smart watches, programmable consumer electronics, multiprocessor systems, microprocessor-based systems, and the like that include any of the above systems or devices, and the like.

In some embodiments, the computer system 100 may be described in the general context of computer system or processor executable instructions, embodied as program modules stored in memory 112, being executed by the computer system. Generally, program modules may include routines, programs, objects, components, logic, data structures, and so on that perform particular tasks and/or implement particular input data and/or data types in accordance with the present invention.

The components of the computer system 100 may include, but are not limited to, one or more processors or processing units 110, a memory 112, and a bus 115 that operably couples various system components, including memory 112 to processor 110. In one or more embodiments, the processor 110, which is also referred to as a central processing unit (CPU) or microprocessor, may execute one or more programs or modules 108, or portions of programs or modules 108, that are loaded from memory 112 to local memory 111, where the program module(s) embody software (program instructions) that cause the processor to perform one or more operations. In some embodiments, module 108 may be programmed into the integrated circuits of the processor 110, loaded from memory 112, storage device 114, network 118 and/or combinations thereof to local memory 111.

The processor (or CPU) 110 can include various functional units (instruction fetch units, decode units, dispatch units, mappers, issue units, history buffers), registers, buffers, execution units, caches, memories, and other units formed by integrated circuitry that will be described in more detail herein, and may operate according to reduced instruction set computing ("RISC") techniques. The processor 110 processes data according to processor cycles, synchronized, in one or more aspects, to an internal clock (not shown). Bus 115 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture bus, Micro Channel Architecture (MCA) bus, Enhanced ISA (EISA) bus, Video Electronics Standards Association (VESA) local bus, and Peripheral Component Interconnects (PCI) bus. The computer system 100 may include a variety of computer system readable media, including non-transitory readable media. Such media may be any available media that is accessible by the computer system 100, and it may include both volatile and non-volatile media, removable and non-removable media.

Memory 112 (sometimes referred to as system or main memory) can include computer readable media in the form of volatile memory, such as random-access memory (RAM), cache memory and/or other forms. Computer system may further include other removable/non-removable, volatile/non-volatile computer system storage media. By way of example only, storage system 114 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 115 by one or more data media interfaces.

The computer system may also communicate with one or more external devices 102 such as, for example, a keyboard, track ball, mouse, microphone, speaker, a pointing device, a display 104, etc.; one or more devices that enable a user to interact with the computer system, such as for example, a keyboard, track ball, mouse, pointing device, microphone, speaker, etc.; and/or any devices (e.g., network card, modem, etc.) that enable the computer system to communicate with one or more other computing devices. Such communication can occur via Input/Output (I/O) interfaces 106. Communications or network adapter 116 interconnects bus 115 with an outside network 118 enabling the data processing system 100 to communicate with other such systems. Additionally, an operating system such as, for example, AIX ("AIX" is a trademark of the IBM Corporation) is used to coordinate the functions of the various components shown in FIG. 1.

The computer system 100 can communicate with one or more networks 118 such as a local area network (LAN), a general wide area network (WAN), and/or a public network (e.g., the Internet) via network adapter 116. As depicted, network adapter 118 communicates with the other components of computer system via bus 115. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

A processor may process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In an example, the pipeline (in addition to other circuitry) may be placed in a portion of the processor referred to as the processor core. Some processors may have multiple processor cores (e.g., multiprocessor system), and in some cases, each processor core may have multiple pipelines. Where a processor core has multiple pipelines, groups of instructions (referred to as issue groups) may be issued to the multiple pipelines in parallel and executed by each of the pipelines in parallel. The pipeline(s) may include multiple stages, such as a decode stage, a dispatch stage, an issue stage, an execution stage, etc. The execution stage may include one or more execution units that process different types of operations as specified by the instructions.

Figure 2:
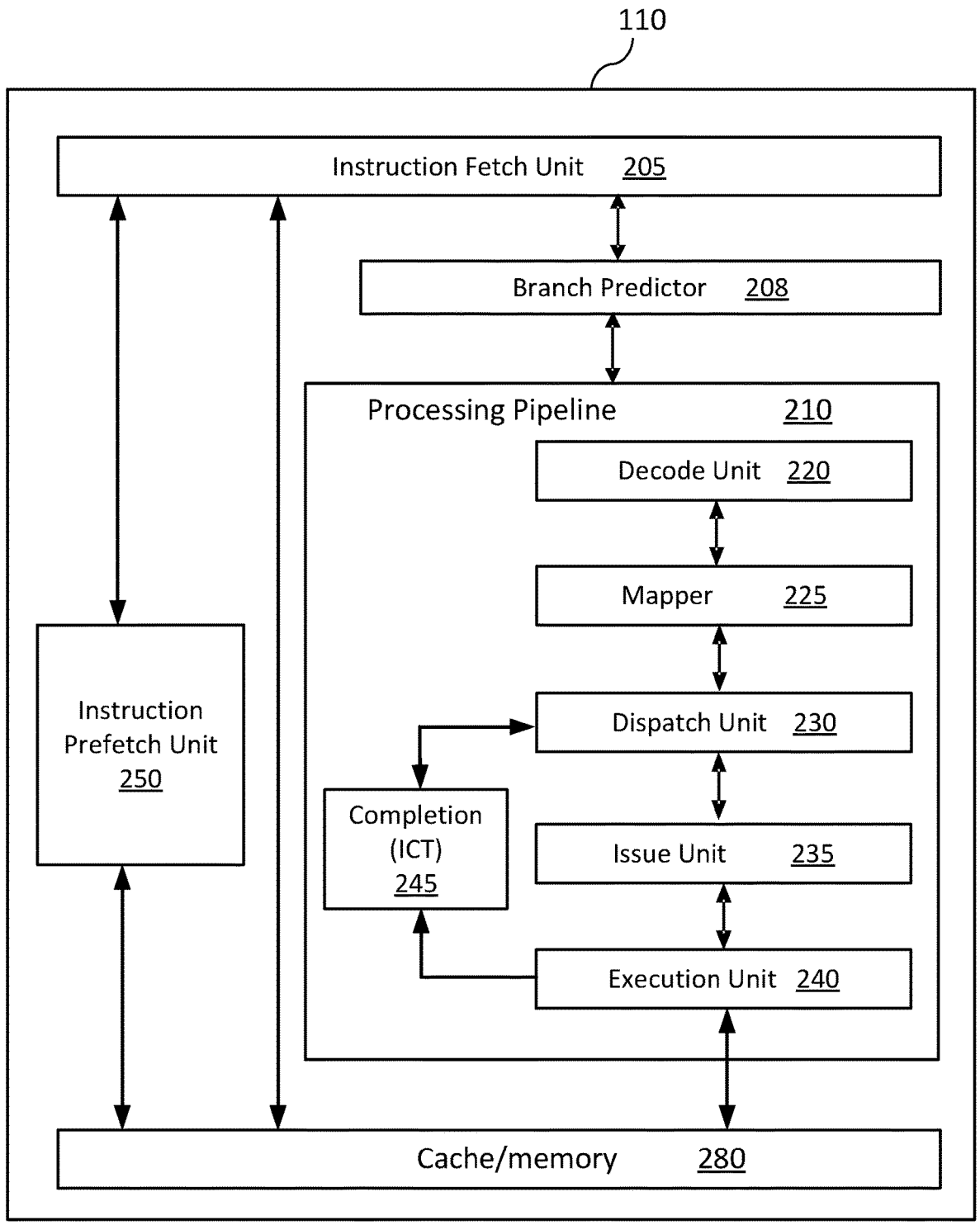
FIG. 2 depicts a block diagram of a processor on which the present disclosure may be practiced in accordance with an embodiment.

FIG. 2 depicts a block diagram of a processor 110 according to an embodiment. The processor 110 can include an instruction fetch unit 205, a branch predictor 208, a processor pipeline or a processing pipeline 210, an Instruction Prefetch Unit 250, and Cache/Memory 280. The processor 110 may be included within a computer processor or otherwise distributed within a computer system. Instructions and data can be stored in and fetched from cache/memory 280. Cache/Memory 280 may include any type of volatile or nonvolatile memory, such as cache memory. Cache/Memory 280 can include multiple cache levels. In one embodiment, Cache/Memory 280 includes an instruction cache that can be configured to provide instructions in an 8-way set associative structure. Alternatively, any other desired configuration and size may be employed for the instruction cache, including, for example, an instruction cache implemented as a fully associative, set associative, or direct mapped configuration.

In FIG. 2, a simplified example of the Instruction Fetch Unit (IFU) 205 and the processing pipeline 210 are depicted. In various embodiments, the processor 110 can include multiple processing pipelines 210 and Instruction Fetch Units 205. In an embodiment, the processing pipeline 210 includes a Decode Unit 220, a Mapper 225, a Dispatch Unit 230, an Issue Unit 235, an Execution Unit 240, and an Instruction Completion Table (ICT) 245. In some examples, the Instruction Fetch Unit 205 and/or the Branch Predictor 208 may also be part of the processing pipeline 210. The processing pipeline 210 may also include other features, for example, physical registers, error checking and handling logic, one or more parallel paths through the processing pipeline 210, and other features now or hereafter known in the art. While FIG. 2 illustrates certain interconnections, pathways, and feedback through the processor 110, other feedback and signaling paths may be included between elements/functional units of the processor 110.

The Instruction Fetch Unit 205 fetches instructions from Cache/Memory 280 according to an instruction address, for further processing by the Decode Unit 220. The Decode Unit 220 decodes instructions and passes the decoded instructions, portions of instructions, or other decoded data to Mapper 225 and Dispatch Unit 230. The Decode Unit 220 may also detect branch instructions which were not predicted by Branch Predictor 208. The Mapper 225 maps logical registers to physical registers, while the Dispatch Unit 230 tags instructions (ITag), sends a tag (ITag) to the Instruction Completion Table (ICT) 245 for tracking, and issues instructions to Issue Unit 235 generally in order. The Issue Unit 235 analyzes the instructions or other data and transmits the decoded instructions, portions of instructions, or other data to one or more execution units in the Execution Unit 240 based on the analysis. The Execution Unit 240 executes the instructions, and upon execution sends the tag (ITag) of the executed instruction to the Instruction Completion Table (ICT) 245.

The Execution Unit 240 may include a plurality of execution units, such as fixed-point execution units, floating-point execution units, load/store execution units (e.g., load store unit denoted as LSU), and vector multimedia execution units to name a few. Write-back logic writes results of instruction execution back to a destination resource. The destination resource may be any type of resource, including registers, cache memory 280, other memory, I/O circuitry to communicate with other devices, other processing circuits, or any other type of destination for executed instructions or data.

In an example, an execution slice may be referred to as a set of data processing circuitry or hardware units connected in series within a processor core. An execution slice may be a pipeline or pipeline-like structure. Multiple execution slices may be used as part of simultaneous multi-threading within a processor core among multiple processor cores of a multiprocessor system. In modern computer architecture, there can be multiple execution units within an execution slice including LSUs, vector-scalar units (VSUs), arithmetic logic units (ALUs), among other execution units.

Branch instructions (or "branches") are types of instructions typically processed and/or handled in processor 110. Branch instructions can be either unconditional, meaning that the branch is taken every time that the instruction is encountered in the program, or conditional, meaning that the branch is either taken or not taken, depending upon a condition. The processor 110 can handle conditional branch instructions which allow a computer program to branch from one instruction to a target instruction (thereby skipping intermediate instructions (if any) and processing instructions in a non-sequential manner) if a condition is satisfied. If the condition is not satisfied, the next instruction after the branch instruction may be executed without branching to the target instruction.

Most often, the instructions to be executed following a conditional branch are not known with certainty until the condition upon which the branch depends has been resolved. A Branch Predictor 208 can attempt to predict the outcome of conditional branch instructions in a program before the branch instruction is executed. If a branch is mispredicted, all of the speculative work, beyond the point in the program where the branch is encountered, is typically discarded. For example, when a conditional branch instruction is encountered, the processor 110 may predict which instruction will be executed after the outcome of the branch condition is known. Then, instead of stalling the processing pipeline 210 when the conditional branch instruction is issued, the processor may continue issuing instructions beginning with the predicted next instruction.

In an embodiment, processor 110 may perform branch prediction in order to speculatively fetch instructions subsequent to conditional branch instructions. Branch Predictor 208 is included to perform such branch prediction operations. Branch Predictor 208 provides an indication of the instruction address being fetched, so that Branch Predictor 208 may determine which branch target addresses to select for forming a branch prediction. The Branch Predictor 208 may be coupled to various parts of the processing pipeline 210, such as, for example, Execution Unit 240, Decode Unit 220, Mapper 225, etc. to determine if the predicted branch direction is correct or incorrect. The Execution Unit 240, for example, can determine if the predicted branch direction is incorrect. The branch direction may be "taken", in which case subsequent instructions are fetched from the target address of the branch instruction. Conversely, the branch direction may be "not taken", in which case subsequent instructions are fetched from memory locations consecutive to the branch instruction. When a mis-predicted branch instruction is detected, instructions subsequent to the mis-predicted branch typically are discarded from the various units of processor 110. One or more of the processor pipeline units may also provide information regarding the execution of conditional branch instructions to the Branch Predictor 208.

Processor 110 in illustrative embodiment of FIG. 2 also includes an Instruction Prefetch Unit 250. Prefetching is a technique used by computer processors to boost execution performance by fetching instructions or data from their original generally slower memory storage to a faster local memory before it is actually needed. Instruction Prefetch Unit 250 fetches instructions into cache/memory 280 before they need to be executed. Instruction Prefetch Unit 250 watches streams of instructions being requested by the executing program and recognizes the next few elements that the program might need based upon the stream and prefetches the instructions into the processor Cache/Memory 280. One of the types of instructions that are subject to being prefetched by Instruction Prefetch Unit 250 are branch instructions, including conditional branch instructions. Typically, both types of conditional branch instructions, direct branches and indirect branches are subject to prefetching by Instruction Prefetch Unit 250. That is, the targets of the branch instructions can be subject to prefetching. The targets for the direct branches can be fairly predictable. The targets for the indirect branches, however, can be somewhat unpredictable without any recent branch history, but can be somewhat predictable given some recent branch history.

In an embodiment, the processor 110 can be a SMT processor configured to perform multithreading. In an example, the processor 110 may be a multicore processor including two or more processor cores, and each core may be configured to process one or more threads. In an example, each processor core may be configured to process a respective thread. In another example, each processor core may be configured as a multithread processor that can process multiple threads.

Figure 3:
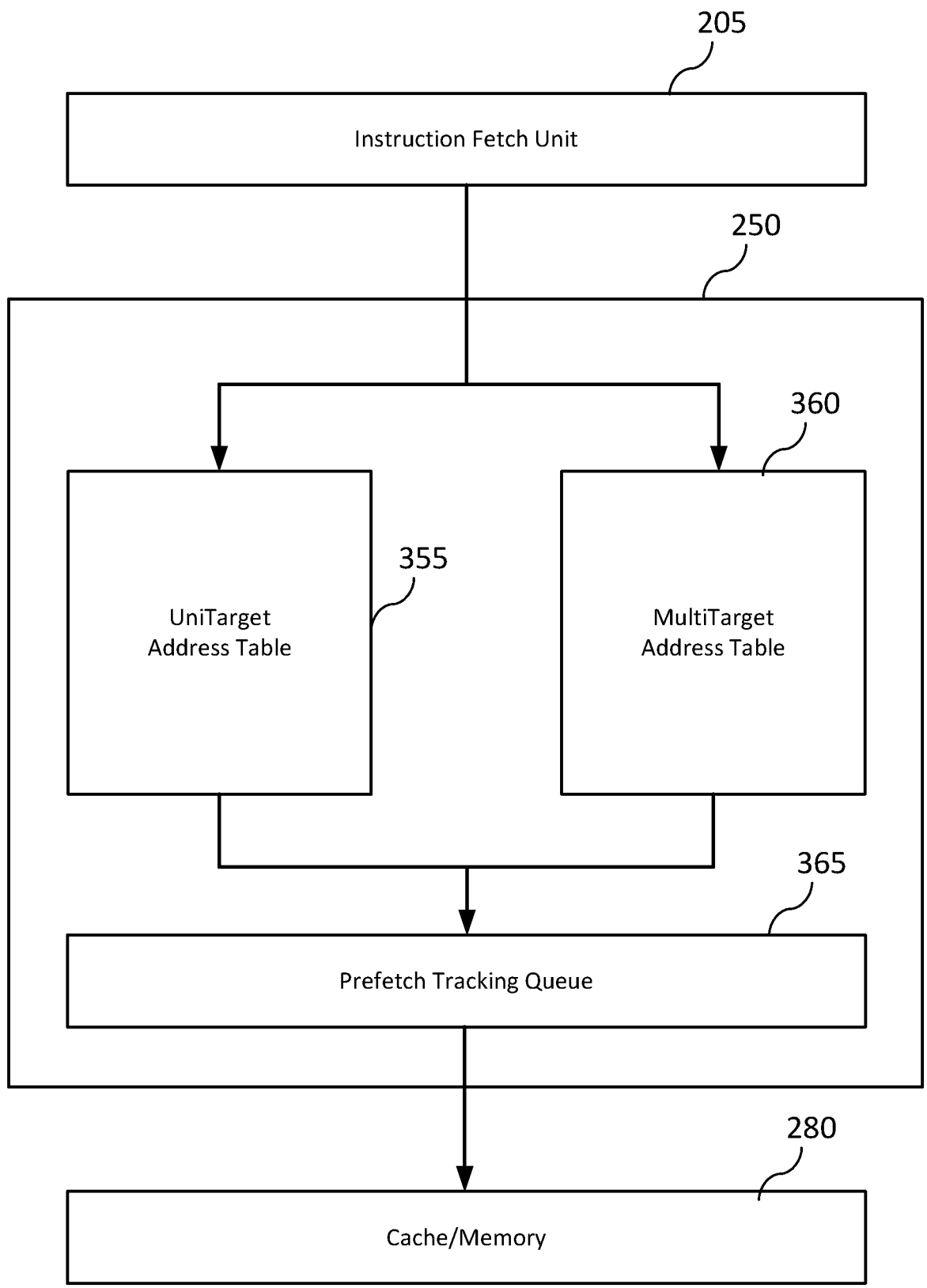
FIG. 3 schematically shows a block diagram of a portion of an exemplary processor and associated example prefetcher on which the present disclosure may be practiced according to an embodiment.

FIG. 3 illustrates an exemplary Instruction Prefetcher Unit 250 or Prefetcher 250 for prefetching instructions to Cache/Memory 280. Instruction Prefetcher Unit 250 includes multiple instruction prefetching tables, Uni-Target Table 355 and Multi-Target Table 360, and Prefetch Tracking Queue 365. In one or more embodiments, Uni-Target Table 355 is accessed using only the trigger address while Multi-Target Address Table 360 is accessed by hashing the trigger address with recent branch history, and can have multiple entries in the table for the same branch to cover the multiple possibilities of the multi-target branch instruction. Uni-Target Table 355 according to an embodiment can have more entries than Multi-Target Table 360 as direct branch instructions typically are more common than indirect branch instructions. Uni-Target Table 355 can also have a smaller target field than the Multi-Target Table 360 as the target tends to be a short jump away from the current location for indirect branch instructions. It can be appreciated that the number of entries for the Uni-Target Table 355 can be the same as or less than the Multi-Target Table 360 and the target field for the Uni-Target Table 355 can be the same size as or larger than the Multi-Target Address Table 360.

Figure 4:
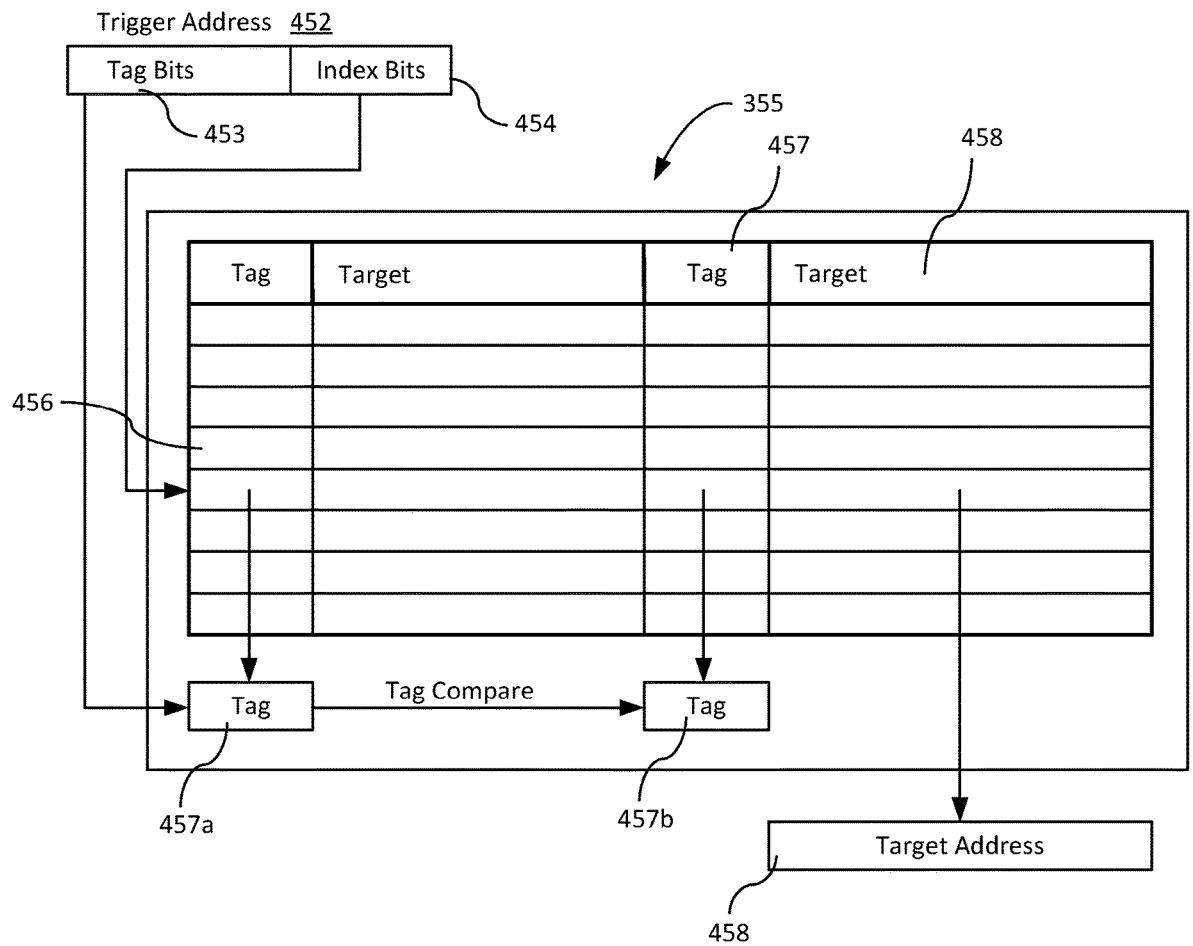
FIG. 4 schematically shows a block diagram of a unitarget prefetch table on which the present disclosure may be practiced according to an embodiment.

Both the Uni-Target Table 355 and Multi-Target Table 360 are similar in terms of the fields in the tables, and generally include a tag (e.g., a portion of the instruction (trigger) address), a target address (e.g., the target address when the branch is taken), a confidence field, and some additional bits for validity and replacement. Both tables may be direct mapped or set associative. An example of a two-way set associative Uni-Target Table 355 is shown in FIG. 4. The Uni-Target Table 355 is indexed and tagged using the previous instruction address, fetch address, and/or cache line address (e.g., trigger address) 452, preferably only the previous trigger address. Trigger address 452 includes Tag bits 453 and index bits 454. The Tag bits 453 can include 10-20 bits while the Index bits 454 can include 9-14 bits, although other bit field sizes are contemplated. Typically, a subset of the trigger address will be used to access the table, but the whole address can also be used. The Uni-Target Table 355 stores a trigger instruction address 452 (which contains the branch) or a portion thereof (tag bits 453 and index bits 454) and a target instruction address 457 (which is the target when the branch is taken in the code). Since the Uni-Target Table 355 contains uni-target branch instructions, typically no consideration is made for any path history vector information. The addition of path history vector information could pollute the Uni-Target Table 355 since the same trigger instruction address may show up with multiple different histories in different locations.

In operation, Index bits 454 of a trigger instruction address 452 are compared to entries 456 in Uni-Target Table 355 to find the matching entry row 456 in Uni-Target Table 355, and then the Tag bits 453 from the trigger instruction address 452 are compared to Tag bits 457 from the different Ways in the matching index entry 456 in the Uni-Target Table 355. If the Tag bits 453 from the trigger address 452 match Tag bits 457 in one of the Ways of the matching index entry 456 of the Uni-Target Table 355, the Uni-Target Table 355 provides the target address 458. In the example Uni-Target Table 355 of FIG. 4, the Tag bits 457a of Way 0 do not match the Tag bits 453 of the trigger address 452 while the tag bits 457b of Way 1 does match the tag bits 453 of the trigger address 452 and the target address 458 is taken from, provided by, and/or read from Way 1 of the Uni-Target Table 355.

While no consideration is given for any path history information vector in the Uni-Target Table 355 of FIG. 4, as addition of information vector to the Uni-Target Table 355 could pollute the table, it may be beneficial in circumstances to also have path history for some direct conditional branch instructions in Uni-Target Table 355.

An example Multi-Target Table 360 is indexed and tagged using the previous instruction address, fetch address, and/or cache line address (e.g., trigger address) 452 hashed with an information vector, such as, for example, an indirect global history vector for the branch instruction. By using a history vector, there can be multiple instances of the same trigger cache line based upon different branch histories. Ideally the multi-target table is large enough to cover all histories (e.g., all the targets) of the branch instruction, however, more realistically the multi-target table will be able to identify a large number of targets for the same trigger address. In an embodiment, the branch history is hashed with the index bit portion 454 of the target address 452 for a multi-target branch trigger address, which leads to multiple entries for the same trigger, ideally leading to multiple different targets.

Figure 5:
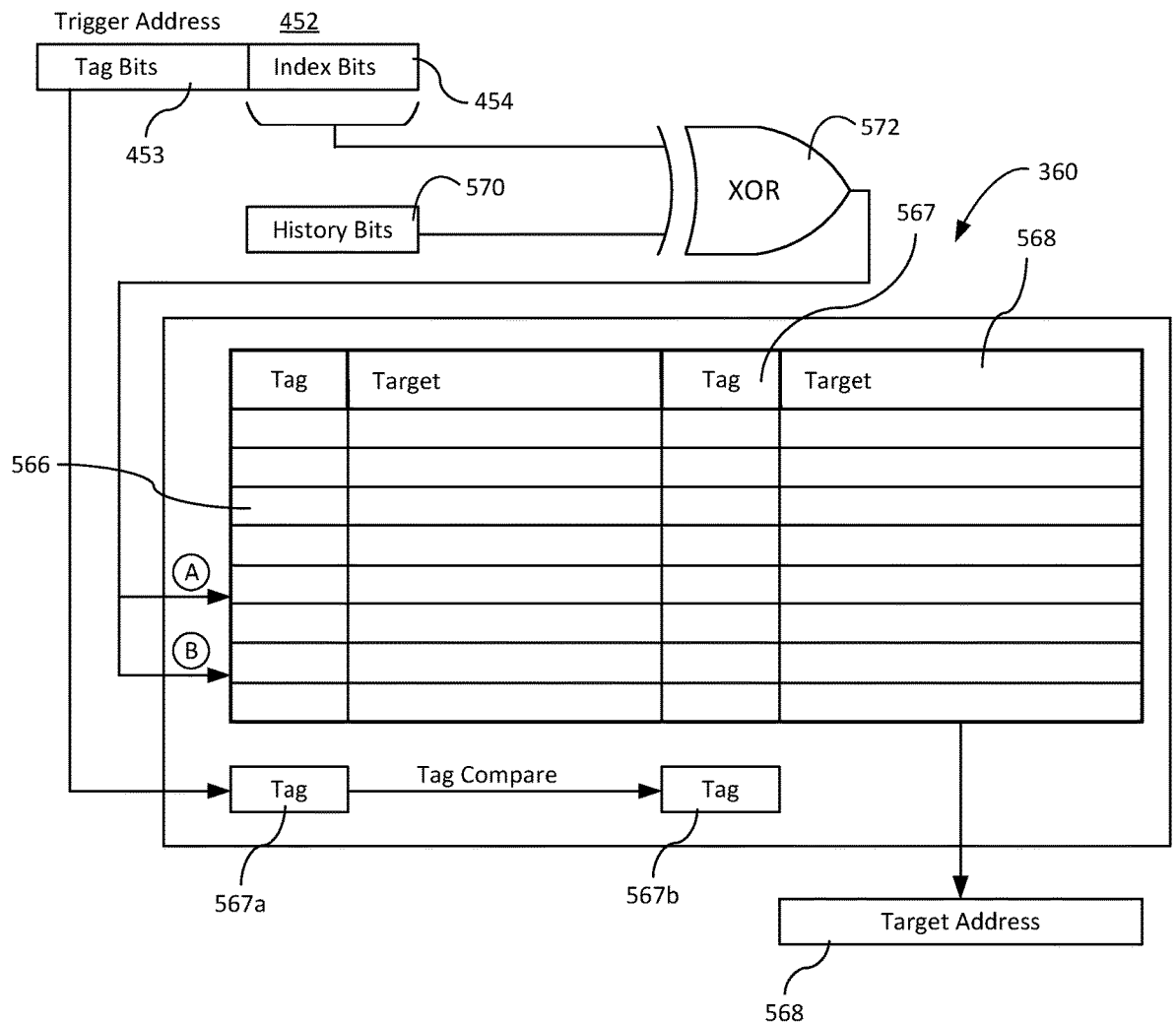
FIG. 5 schematically shows a block diagram of a multitarget prefetch table on which the present disclosure may be practiced according to an embodiment.

An example of a two-way set associative Multi-Target Table 360 is shown in FIG. 5. Trigger address 452 includes Tag bits 453 and Index bits 454. The Tag bits 453 can include 10-20 bits while the Index bits 454 can include 9-14 bits, although other bit field sizes are contemplated. Typically, a subset of the trigger address will be used to access the table, however, the whole address may also be used. The Multi-Target Table 360 is indexed by a hash of the Branch History bits 570 and the Index bits 454. The Branch History bits 570 can include for example a 10 bit history field and can include the history of the last N number of branch instructions. For example, the number N of branch instructions included in the History Bits field can be fixed, pre-set, predetermined, adjustable, and/or programmable, and in an embodiment can include the recent behavior of multi-target branches. In an approach the history of the N most recent branches can include a "1" if the branch is taken, and a "0" if the branch is not taken.

In the example Multi-Target Table 360 of FIG. 5, the History bits 570 and the Index bits 454 are hashed by XOR logic 572 and used as an index into Multi-Target Table 360. In this example, since the history bits are used to index into the Multi-Target Address Table 360 only one target 568 should be selected from the Multi-Target Table 360. In operation, Index bits 454 of a trigger instruction address 452 are submitted with History bits 570 to XOR 572 and the output of XOR 572 is compared to entries 566 in Multi-Target Table 360 to find the matching entry row 566 in Multi-Target Table 360, and then Tag bits 453 from the trigger instruction address 452 are compared to Tag bits 567 from the different Ways in matching index entry 566 in the Multi-Target Table 360. If the Tag bits 453 from the trigger address 452 match Tag bits 567 in one of the Ways of the matching index entry 566 of the Multi-Target Table 360, the Way with the matching Tags bits 567 in the Multi-Target Table 360 provides and/or identifies the target address 568.

In the example Multi-Target Table 360 of FIG. 5, the output of the XOR 572 that serves as the index/input into the Multi-Target Table 360 matches entry "A" at time T0, while the output of the XOR 572 that serves as the index/input into Table 360 matches entry "B" at time T1. In this manner, the same trigger address (e.g., the same Index bits 454 of the trigger address 452) points to different index entries 566 in Multi-Target Address Table 360 that are differentiated by the branch history 570, which Multi-Target Table 360 takes into account. For example, if Index bits 453 from trigger address 452 are 10001000, and history A of the trigger address has History bits 570 of 11110000, then the index after hashing (e.g., the output of the XOR 572) is 01111000, which points to entry "A" (representing time T0) in the Multi-Target Table 360. If Index bits 453 from trigger address 452 are 10001000, while history B of the trigger address has History bits 570 of 00001111, then the index after hashing (e.g., the output of the XOR 572) is 10001111, which points to entry "B" (representing time T1) in the Multi-Target Table 360. That is, history A and history B result in two different indices into the Multi-Target Table 360 after the history bits 570 are Xor-ed with the same index bits 453.

In the example Multi-Target Table 360, because the Tag bits 567a of Way 0 do not match the Tag bits 453 of the trigger address 452 while the Tag bits 567b of Way 1 do match the Tag bits 453 of the trigger address 452, the target address 568 is provided by, read from, and/or taken from Way 1 of the Multi-Target Table 360. It can be appreciated that the Tag bits of the trigger address might not match any of the Tag bits in the matching index row 566 of the Multi-Target Table 360 as there may be more targets for the branch instruction than entries in the Multi-Target Table 360.

It can be appreciated that segmentation of the of the branch tables by branch type (e.g., uni-target branches and multi-target branches) can provide improved instruction prefetch behavior for Instruction Prefetch Unit 250. It can be further appreciated that more than one table can be used for multi-target branch instructions, for example different multi-target tables based upon: branch type, different information vector lengths, and/or different information vectors. It can be further appreciated that while the uni-target direct branch prefetch table and the multi-target indirect branch prefetch table have been shown as having 2 Ways (two entries for each index), it can be appreciated that each table can be direct mapped or have more than 2 Ways per index entry.

Figure 6:
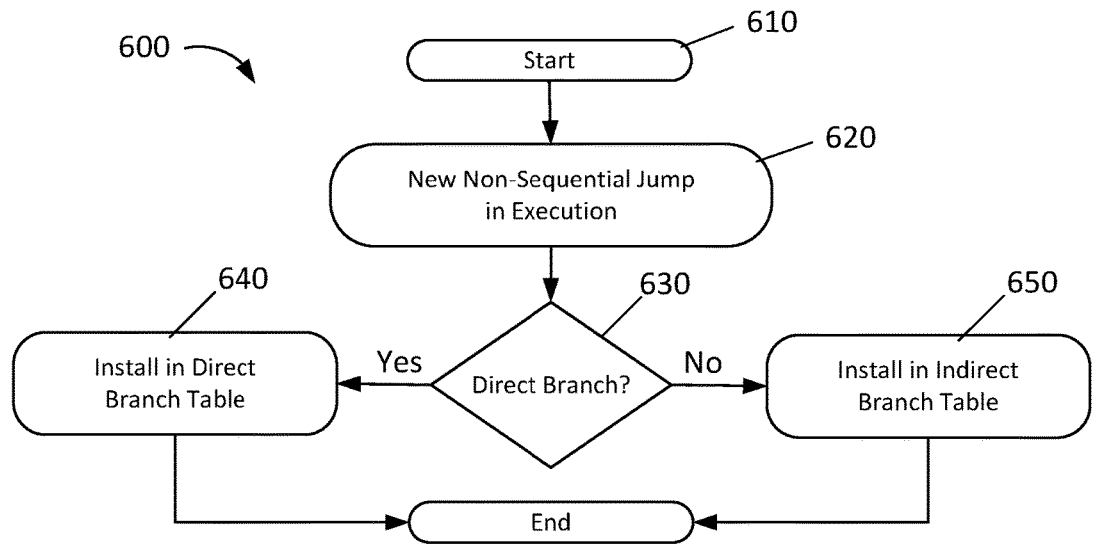
FIG. 6 shows a flow chart of a method of installing branch instructions into one of multiple prefetch tables in a prefetcher, according to an embodiment of the disclosure.

FIG. 6 outlines an exemplary flowchart in accordance with various embodiments illustrating and describing a method 600 of installing entries into prefetcher 250 containing multiple tables, i.e., a Uni-Target Table and a Multi-Target Table. While the method 600 is described for the sake of convenience and not with an intent of limiting the disclosure as comprising a series and/or a number of steps, it is to be understood that the process 600 does not need to be performed as a series of steps and/or the steps do not need to be performed in the order shown and described with respect to FIG. 6, but the process 600 can be integrated and/or one or more steps can be performed together, simultaneously, or the steps can be performed in the order disclosed or in an alternate order.

The process 600 starts (610) and at 620 a non-sequential jump in code execution is detected, e.g., a branch instruction is detected. It is determined at 630, in response to detecting a non-sequential jump in code execution (e.g., detecting a branch instruction), whether the branch is a direct branch (a uni-target branch) or an indirect branch (a multi-target branch). If at 630 it is determined that the branch is a direct branch (a uni-target branch) (630: Yes), then process 600 proceeds to 640 where the trigger address and associated target are installed in a direct branch table (e.g., a Uni-Target Table), and if it is determined at 630 that the branch is an indirect branch (a multi-target branch) (630: No), then process 600 proceeds to 650 where the trigger address and associated target are installed in an indirect table (e.g., a Multi-Target Address Table). More particularly, in an approach, the index bits are hashed with the branch history (the parent branch history) and used as an index to a row and the tag bits of the instruction address and associated target are entered into the Table. The process 600 then concludes until another non-sequential jump in code execution (e.g., a branch instruction) is detected at 610.

Figure 7:
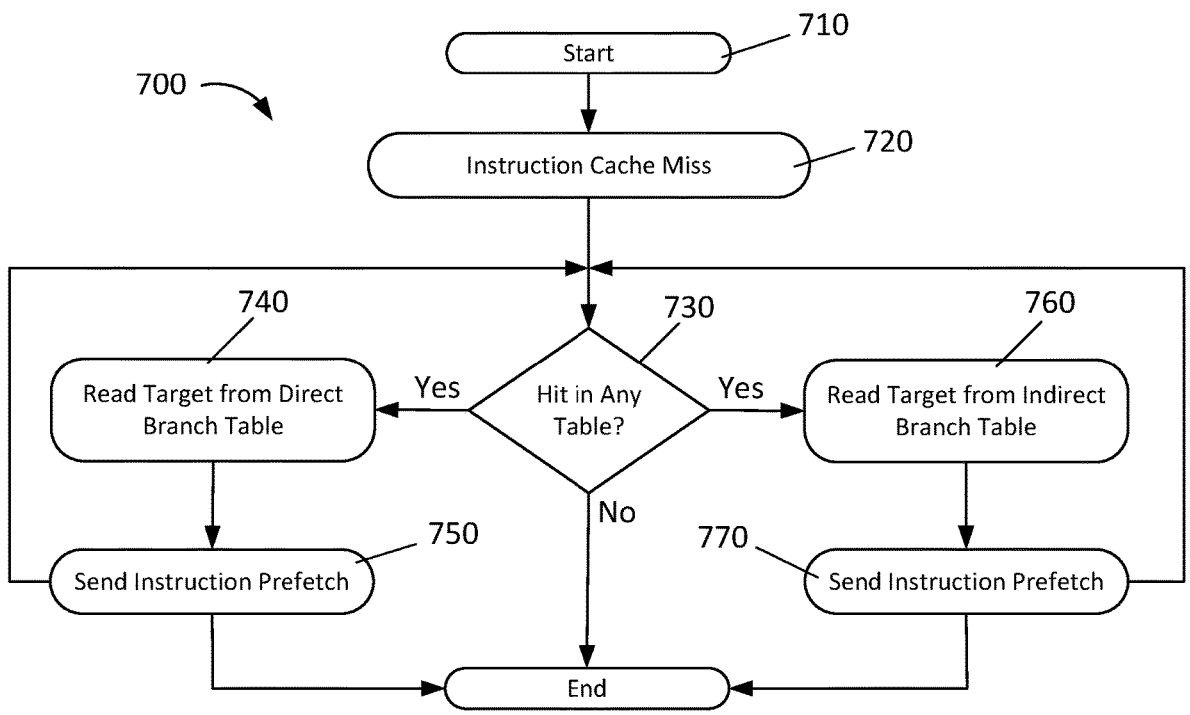
FIG. 7 shows a flow chart of a method of prefetching instructions in a processor, according to an embodiment of the disclosure.

FIG. 7 outlines an exemplary flowchart in accordance with various embodiments illustrating and describing a method 700 of prefetching instructions, preferably using a prefetcher that has multiple prefetch tables, including a uni-target Table and a multi-target table. While the method 700 is described for the sake of convenience and not with an intent of limiting the disclosure as comprising a series and/or a number of steps, it is to be understood that the process 700 does not need to be performed as a series of steps and/or the steps do not need to be performed in the order shown and described with respect to FIG. 7, but the process 700 can be integrated and/or one or more steps can be performed together, simultaneously, or the steps can be performed in the order disclosed or in an alternate order.

Process 700 of prefetching instructions from a prefetcher starts (710) and at 720 a miss at the instruction cache is detected. In response to the miss at the instruction cache, it is determined at 730 whether the trigger address is a hit in any of the tables, including in an example whether the trigger address is a hit in the direct branch (uni-target) table or a hit in the indirect branch (multi-target) table. In one or more approaches all (both) tables are looked upon concurrently on a cache miss. That is, at 730 it is determined whether the branch instruction (trigger) address exists in the direct (uni-target) table at the same time it is determined whether the branch instruction (trigger) address exists in the indirect (multi-target) table. The lookup in the indirect (multi-target) branch table is done preferably by hashing the index bits of the trigger address with the branch history (e.g., the history bits). If at 730 there are no hits in either the direct branch (uni-target) table or the indirect branch (multi-target) table (730: No), then no target is provided for the branch instruction and the next cache line is not prefetched to the instruction cache.

If at 730 there is a hit in the direct branch (uni-target) table, meaning that the instruction address is in the direct branch (uni-target) table, then at 740 the target is read from the direct branch (uni-target) table. After 740, process 700 proceeds to 750 where the instruction prefetch is sent, and in an embodiment the instruction is prefetched to the Cache/memory. In an embodiment, the target address read from the uni-target table is used to obtain the instruction from memory to the instruction cache. After 750, if it is determined that there is more prefetch bandwidth available, then process 700 continues to prefetch instructions, and in an embodiment can continue to 730 where it is determined if the next non-sequential jump in code execution (e.g., the next branch instruction) is a hit in one of the tables in the prefetcher.

If at 730 there is a hit in the indirect branch (multi-target) table, meaning that the instruction address is in the indirect branch (multi-target) table, then at 760 the target is read from the indirect branch (multi-target) table. After 760, process 700 proceeds to 770 where the instruction prefetch is sent, and in an embodiment the instruction is prefetched to the Cache/memory. In an embodiment, the target address read from the multi-target table is used to obtain the instruction from memory to the instruction cache. After 750, if it is determined that there is more prefetch bandwidth available, then process 700 continues to prefetch instructions, and in an embodiment can continue to 730 where it is determined if the next non-sequential jump in code execution (e.g., the next branch instruction) is a hit in one of the tables in the prefetcher.

It will be understood that one or more blocks of the flowchart illustrations in FIGS. 6-7, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

In one or more embodiments an instruction prefetch table for an instruction prefetcher in a processor is disclosed where the instruction prefetch table includes: a plurality of entries, each entry for storing a first portion of bits of an indirect branch instruction address and a target address corresponding to the indirect branch instruction address, wherein the indirect branch instruction has multiple target addresses, and wherein the instruction prefetch table is accessed by an index obtained by hashing a second portion of bits of the indirect branch instruction address with an information vector of the indirect branch instruction. In an approach, the first portion of bits are tag bits of an indirect branch instruction address and is 10-20 bits in length and the second portion of bits are index bits of the indirect branch instruction address and is 8-16 bits in length, and each index of the instruction prefetch table has a plurality of associated Ways having tag bits and an associated target address. In a further approach, the instruction prefetch table is configured to determine if an incoming indirect branch instruction matches an entry in the instruction prefetch table by: identifying an index into the instruction prefetch table for the incoming branch instruction by hashing a first portion of the incoming branch instruction with an information vector for the incoming branch instruction; reading one or more tag bits from one or more Ways corresponding to the identified index; determining whether the one or more tag bits read from the one or more Ways in the prefetch table matches the tag bits from the incoming branch instruction; and determining, in response to one or more tag bits read from the one or more Ways in the prefetch table matching the tag bits from the incoming branch instruction, that there is a hit in the prefetch table. It can be appreciated that determining whether there is a matching Way can be performed in a number of different ways including reading out the tag bits in each Way in the identified index and comparing to the respective tag bits of the incoming branch instruction.

A processor according to one or more arrangements is also disclosed, the processor in a configuration including: an instruction fetch unit for fetching instructions for processing in a processor, including branch instructions; and an instruction prefetch unit for prefetching instructions into an instruction cache, the prefetch unit having at least two different type of branch instruction prefetch tables for storing a branch instruction address or portion of a branch instruction address (e.g., a branch instruction address identifier) and a target address relationship, a first type of branch instruction prefetch table for handling direct uni-target branch instructions and a second type of branch instruction prefetch table for handling indirect multi-target branch instructions. The processor is configured according to an embodiment to: send a branch instruction to the instruction prefetch unit; determine whether the branch instruction sent to the instruction prefetch unit hits in the first type of branch instruction prefetch table or the second type of branch instruction prefetch table; read, in response to the branch instruction hitting in one of the first type of branch instruction prefetch table or the second type of branch instruction prefetch table, a target address from the respective first type of branch instruction prefetch table or the second type of branch instruction prefetch table in which the branch instruction hit; and prefetch the target address/line to the instruction cache.

The processor in one or more embodiments is further configured to concurrently search the first type of branch instruction prefetch table and the second type of branch instruction prefetch table. In an aspect, the second type of branch instruction prefetch table is indexed by a first portion of a branch instruction address and a hash of history bits of the branch instruction address. The processor preferably is further configured to: has a first portion of the incoming branch instruction with an information vector for the incoming branch instruction to obtain an index into the second type of branch instruction prefetch table; read the one or more tag bits from the one or more Ways of the second type of branch instruction prefetch table corresponding to the index; determine whether the one or more tag bits read from the one or more Ways in the second type of branch instruction prefetch table match the tag bits from the incoming branch instruction; and determine, in response to one or more tag bits read from the one or more Ways in the second type of branch instruction prefetch table matching the tag bits from the incoming branch instruction, that there is a hit in the second type of branch instruction prefetch table.

The processor is further configured according to one or more embodiments to: obtain an index into the first type of branch instruction prefetch table from a first portion of the incoming branch instruction; read the one or more tag bits from the one or more Ways in the first type of branch instruction prefetch table corresponding to the index; determine whether the one or more tag bits read from the one or more Ways in the first type of branch instruction prefetch table matches the tag bits from the incoming branch instruction; and determine, in response to one or more tag bits read from the one or more Ways from the first type of branch instruction prefetch table matching the tag bits from the incoming branch instruction, that there is a hit in the first type of branch instruction prefetch table. In a further aspect, the processor is further configured to install a branch instruction into one of the first type of branch instruction prefetch tables or the second type of branch instruction prefetch tables unit based upon the type of branch instruction.

A method of prefetching instructions in a processor is also disclosed. In an embodiment, the method includes: detecting a branch instruction that misses in an instruction cache; determining whether the branch instruction that missed in the instruction cache hits in one of multiple prefetch tables in an instruction prefetcher, wherein a first prefetch table of the multiple prefetch tables stores target addresses for uni-target branch instructions and a second prefetch table of the multiple prefetch tables stores target addresses for multi-target branch instructions; reading, in response to the branch instruction that missed in the instruction cache hitting in one of the multiple prefetch tables in the prefetcher, a target address for the branch instruction from the respective prefetch table in which the branch instruction hit; and prefetching the target address of the branch instruction to an instruction cache. Determining whether the branch instruction that missed in the instruction cache hits in one of the multiple prefetch tables can include concurrently searching the first prefetch table and the second prefetch table. In an arrangement, the second prefetch table is indexed by a first portion of a branch instruction address and a hash of history bits of the branch instruction address, and preferably is indexed by XORing the first portion of the branch instruction with the history bits of the branch instruction. The method according to an aspect can further include determining whether the branch instruction that missed in the instruction cache hits in a third prefetch table, wherein the second prefetch table stores a target address for a first type of multi-target branch instruction and the third prefetch table stores a target address for a second type of multi-target branch instruction.

The method of determining whether the branch instruction hits in the second prefetch table in an embodiment includes: obtaining and/or determining an index into the second prefetch table for the incoming branch instruction by hashing a first portion of the incoming branch instruction with an information vector for the incoming branch instruction; reading one or more tag bits from the one or more Ways corresponding to the index into the second prefetch table; determining whether the one or more tag bits read from the one or more Ways in the second prefetch table matches the tag bits from the incoming branch instruction; and determining, in response to one or more tag bits read from the one or more Ways in the second prefetch table matching the tag bits from the incoming branch instruction, that there is a hit in the second prefetch table. The information vector can be at least one of a group consisting of: a global direction history vector, an indirect global history vector, and combinations thereof.

The method in a further embodiment can include: determining and/or obtaining an index into the first prefetch table for the incoming branch instruction from a first portion of the branch instruction; reading the one or more tag bits from the one or more Ways in the first prefetch table corresponding to the determined index; determining whether the one or more tag bits read from the one or more Ways in the first prefetch table matches the tag bits from the incoming branch instruction; and determining, in response to one or more tag bits read from the one or more Ways from the first prefetch table matching the tag bits from the incoming branch instruction, that there is a hit in the first prefetch table. The method according to an aspect can further include installing a branch instruction into one of the multiple prefetch tables in the instruction prefetch unit based upon the type of branch instruction. The installing process can in an approach include: determining the type of branch instruction; installing, in response to the determining the branch instruction is a direct uni-target branch instruction, the branch instruction and a target relationship into the first prefetcher table; and installing, in response to the determining the branch instruction is an indirect multi-target branch instruction, the branch instruction and a target relationship into the second prefetcher table.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of prefetching instructions in a processor, the method comprising:
    detecting a branch instruction that misses in an instruction cache;
    sending the branch instruction that misses in the instruction cache to an instruction prefetcher separate from a branch prediction unit, wherein the instruction prefetcher has multiple different types of branch instruction prefetch tables, wherein a first type branch instruction prefetch table of the multiple different types of branch instruction prefetch tables stores target addresses for uni-target branch instructions and a second type branch instruction prefetch table of the multiple different types of branch instruction prefetch tables stores target addresses for multi-target branch instructions;
    determining whether the branch instruction that missed in the instruction cache hits in one of multiple different types of branch instruction prefetch tables in the instruction prefetcher for prefetching instructions into the instruction cache before needed for later execution in the processor;
    reading, in response to the branch instruction that missed in the instruction cache hitting in one of the multiple different types of branch instruction prefetch tables in the instruction prefetcher, a target address for the branch instruction from a respective branch instruction prefetch table in which the branch instruction hit; and
    prefetching the instruction at the target address for the branch instruction to the instruction cache.

2. The method of claim 1, wherein determining whether the branch instruction that missed in the instruction cache hits in one of the multiple different types of branch instruction prefetch tables includes concurrently searching the first type branch instruction prefetch table and the second type branch instruction prefetch table.

3. The method of claim 1, wherein the second type branch instruction prefetch table is indexed by a first portion of a branch instruction address and a hash of history bits of the branch instruction address.

4. The method of claim 3, wherein the second type branch instruction prefetch table is indexed by XORing the first portion of the branch instruction address with the history bits of the branch instruction.

5. The method of claim 1, further comprising determining whether the branch instruction that missed in the instruction cache hits in a third type branch instruction prefetch table, wherein the second type branch instruction prefetch table stores a target address for a first type of multi-target branch instruction and the third type branch instruction prefetch table stores a target address for a second type of multi-target branch instruction.

6. The method of claim 1, wherein determining whether the branch instruction hits in the second type branch instruction prefetch table comprises:
   determining an index for the second type branch instruction prefetch table by hashing a first portion of the branch instruction with an information vector;
   reading one or more tag bits from one or more Ways corresponding to the determined index in the second type branch instruction prefetch table;
   determining whether the one or more tag bits read from the one or more Ways in the second type branch instruction prefetch table matches tag bits from the branch instruction; and
   determining, in response to one or more tag bits read from the one or more Ways in the second type branch instruction prefetch table matching the tag bits from the branch instruction, that there is a hit in the second type branch instruction prefetch table.

7. The method of claim 6, wherein the information vector is at least one of a group consisting of: a global direction history vector, an indirect global history vector, and combinations thereof.

8. The method of claim 6, further comprising XORing an index portion of the branch instruction with history bits of the branch instruction to determine the index for the second type branch instruction prefetch table.

9. The method of claim 6, wherein determining whether the branch instruction hits in the first type branch instruction prefetch table comprises:
   determining an index for the first prefetch table from a first portion of the branch instruction;
   reading one or more tag bits from one or more Ways corresponding to the determined index in the first type branch instruction prefetch table;
   determining whether the one or more tag bits read from the one or more Ways in the first type branch instruction prefetch table matches the tag bits from the branch instruction; and
   determining, in response to one or more tag bits read from the one or more Ways from the first type branch instruction prefetch table matching the tag bits from the branch instruction, that there is a hit in the first type branch instruction prefetch table.

10. The method of claim 9, further comprising:
    determining the type of branch instruction;
    installing, in response to the determining the branch instruction is a direct uni-target branch instruction, the branch instruction and a target relationship into the first type branch instruction prefetcher table; and
    installing, in response to the determining the branch instruction is an indirect multi-target branch instruction, the branch instruction and a target relationship into the second type branch instruction prefetcher table.

11. The method of claim 1, further comprising installing a branch instruction into one of the multiple different types of branch instruction prefetch tables in the instruction prefetcher based upon a type of branch instruction.

12. A processor comprising:
    an instruction fetch unit for fetching instructions, including branch instructions, from an instruction cache for processing in a processor;
    a branch prediction unit for predicting branch instructions; and
    an instruction prefetch unit for prefetching instructions into the instruction cache before needed for later execution in the processor, the instruction prefetch unit having at least two different types of branch instruction prefetch tables for storing a branch instruction address identifier and a target address relationship, a first type of branch instruction prefetch table for handling direct uni-target branch instructions and a second type of branch instruction prefetch table for handling indirect multi-target branch instructions,
    wherein the processor is configured to prefetch instructions to the instruction cache before needed for later execution by the processor by:
    sending instructions, including a branch instruction that missed in the instruction cache, to the instruction prefetch unit before needed for later execution by the processor;
    determining whether the branch instruction sent to the instruction prefetch unit that missed in the instruction cache hits in the first type of branch instruction prefetch table or the second type of branch instruction prefetch table;
    reading, in response to the branch instruction hitting in one of the first type of branch instruction prefetch table or the second type of branch instruction prefetch table, a target address from the respective first type of branch instruction prefetch table or the second type of branch instruction prefetch table in which the branch instruction hit; and
    prefetching the instruction at the target address for the branch instruction to the instruction cache.

13. The processor of claim 12, further configured to concurrently search the first type of branch instruction prefetch table and the second type of branch instruction prefetch table.

14. The processor of claim 12, wherein the second type of branch instruction prefetch table is indexed by a first portion of a branch instruction address and a hash of history bits of the branch instruction address.

15. The processor of claim 12, further configured to:
    hash a first portion of the branch instruction with an information vector to obtain an index into the second type of branch instruction prefetch table;
    read one or more tag bits from one or more Ways of the second type of branch instruction prefetch table corresponding to the index;
    determine whether the one or more tag bits read from the one or more Ways in the second type of branch instruction prefetch table match tag bits from the branch instruction; and
    determine, in response to one or more tag bits read from the one or more Ways in the second type of branch instruction prefetch table matching the tag bits from the branch instruction, that there is a hit in the second type of branch instruction prefetch table.

16. The processor of claim 15, further comprises XORing an index portion of the branch instruction with history bits of the branch instruction to obtain the index into the second type of branch instruction prefetch table.

17. The processor of claim 15, wherein the processor configured to determine whether the branch instruction hits in the first type of branch instruction prefetch table further comprises the processor configured to:
- obtain an index into the first type of branch instruction prefetch table from a first portion of the branch instruction;
- read one or more tag bits from one or more Ways in the first type of branch instruction prefetch table corresponding to the index;
- determine whether the one or more tag bits read from the one or more Ways in the first type of branch instruction prefetch table matches tag bits from the branch instruction; and
- determine, in response to one or more tag bits read from the one or more Ways from the first type of branch instruction prefetch table matching the tag bits from the branch instruction, that there is a hit in the first type of branch instruction prefetch table.

18. The processor of claim 12, wherein the processor is further configured to install a branch instruction into one of the first type of branch instruction prefetch tables or the second type of branch instruction prefetch tables unit based upon a type of branch instruction.

* * * * *